United States Patent
Ökvist et al.

(10) Patent No.: US 10,425,914 B2
(45) Date of Patent: Sep. 24, 2019

(54) METHOD AND NETWORK NODE FOR DECIDING A PROBABILITY THAT A FIRST USER EQUIPMENT IS LOCATED IN A BUILDING

(71) Applicant: Telefonaktiebolaget LM Ericsson (publ), Stockholm (SE)

(72) Inventors: Peter Ökvist, Luleå (SE); Tomas Jönsson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/747,042

(22) PCT Filed: Aug. 31, 2015

(86) PCT No.: PCT/SE2015/050912
§ 371 (c)(1),
(2) Date: Jan. 23, 2018

(87) PCT Pub. No.: WO2017/039495
PCT Pub. Date: Mar. 9, 2017

(65) Prior Publication Data
US 2018/0376450 A1    Dec. 27, 2018

(51) Int. Cl.
*H04W 24/00* (2009.01)
*H04W 64/00* (2009.01)
(Continued)

(52) U.S. Cl.
CPC ......... *H04W 64/003* (2013.01); *G01S 5/0252* (2013.01); *G01S 5/0278* (2013.01);
(Continued)

(58) Field of Classification Search
CPC ....... H04W 64/00; H04W 4/02; H04W 48/04; H04W 76/007
(Continued)

(56) References Cited

U.S. PATENT DOCUMENTS 8,102,314 B2   1/2012   Bamberger et al.
8,830,909 B1   9/2014   Octeau et al.
(Continued)

FOREIGN PATENT DOCUMENTS

CN   2741292 Y   11/2005
CN   2741293 Y   11/2005
(Continued)

OTHER PUBLICATIONS

International Search Report and Written Opinion for International Patent Application No. PCT/SE2015/050912, dated Mar. 8, 2016, 8 pages.
(Continued)

*Primary Examiner* — Temica M Beamer
(74) *Attorney, Agent, or Firm* — Withrow & Terranova, PLLC

(57) ABSTRACT

A method performed by a network node for deciding a probability that a first User Equipment, UE, is located in a building is provided. The network node, the first UE and one or more second UEs operate in a wireless communications network. The network node learns that one or more second UEs are associated to a respective subscription comprised in a group of subscriptions related to the building. The one or more second UEs are decided to be located in said building. The network node identifies cell relation metrics, which relate to the building, for the one or more second UEs associated to the group of subscriptions. The network node then decides the probability that the first UE is located in the building, based on to what extent a cell relation metric of the first UE matches the identified cell relation metrics for the one or more second UEs.

14 Claims, 4 Drawing Sheets

---

201. Receive information about cell relation metric of the respective 2nd UEs.

202. Learn that 2nd UEs are associated to respective subscription comprised in a group of subscriptions related to a building.

203. Identify cell relation metrics for 2nd UEs associated to the group of subscriptions.

204. Receive from 1st UE, information about cell relation metric of 1st UE.

205. Decide probability that 1st UE is located in the building based on to what extent cell relation metric of 1st UE matches identified cell relation metrics for 2nd UEs.

(51) Int. Cl.
  *G01S 5/02* (2010.01)
  *H04W 4/029* (2018.01)
  *H04W 24/10* (2009.01)

(52) U.S. Cl.
  CPC ........... *G01S 5/0284* (2013.01); *H04W 4/029* (2018.02); *H04W 24/10* (2013.01); *H04W 64/00* (2013.01); *H04W 64/006* (2013.01)

(58) Field of Classification Search
  USPC .......... 455/456.1, 456.2, 456.5, 456.6, 404.2
  See application file for complete search history.

(56) References Cited

U.S. PATENT DOCUMENTS

| | | | |
|---|---|---|---|
| 8,930,134 | B2 | 1/2015 | Gu et al. |
| 8,976,679 | B2 | 3/2015 | Timus et al. |
| 9,433,010 | B2 * | 8/2016 | Das .................... H04W 48/04 |
| 2006/0014548 | A1 | 1/2006 | Bolin et al. |
| 2013/0190010 | A1 * | 7/2013 | Chiou .................. H04W 24/10 455/456.1 |
| 2013/0281111 | A1 | 10/2013 | Syrjarinne et al. |
| 2013/0335273 | A1 * | 12/2013 | Pakzad ................ G01C 21/206 342/458 |
| 2014/0357270 | A1 | 12/2014 | Yilmaz et al. |
| 2015/0080017 | A1 | 3/2015 | Zhang et al. |
| 2016/0227367 | A1 * | 8/2016 | Alsehly ................ H04W 4/021 |
| 2017/0064514 | A1 * | 3/2017 | Alles ..................... H04W 4/04 |

FOREIGN PATENT DOCUMENTS

| | | |
|---|---|---|
| EP | 2664167 B1 | 10/2014 |
| KR | 20140060734 A | 5/2014 |
| WO | 2010000465 A1 | 1/2010 |
| WO | 2010101551 A1 | 9/2010 |
| WO | 2012088833 A1 | 7/2012 |
| WO | 2013134724 A1 | 9/2013 |
| WO | 2015118135 A1 | 8/2015 |

OTHER PUBLICATIONS

Supplementary European Search Report for European Patent Application No. 15903150.9, dated Aug. 2, 2018, 3 pages.
Examination Report for European Patent Application No. 15903150.9, dated Aug. 20, 2018, 7 pages.

* cited by examiner

METHOD AND NETWORK NODE FOR DECIDING A PROBABILITY THAT A FIRST USER EQUIPMENT IS LOCATED IN A BUILDING

This application is a 35 U.S.C. § 371 national phase filing of International Application No. PCT/SE2015/050912, filed Aug. 31, 2015, the disclosure of which is incorporated herein by reference in its entirety.

TECHNICAL FIELD

Embodiments herein relate to a network node and a method therein. In particular, they relate to deciding a probability that a first User Equipment (UE) is located in a building.

BACKGROUND

Wireless devices or terminals for communication are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. Two wireless devices involved in Device to Device (D2D) communication may also be referred to as a transmitter-receiver pair. In the context of this disclosure, the expression Downlink (DL) is used for the transmission path from the base station to a wireless device. The expression Uplink (UL) is used for the transmission path in the opposite direction i.e. from the wireless device to the base station.

Universal Mobile Telecommunications System (UMTS) is a third generation mobile communication system, which evolved from the GSM, and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE is controlled by the radio base station.

Indoor utilization of wireless cellular technology is emerging, and with this development, indoor specific deployments increase to meet network capacity and expectations of end user experience.

It will therefore be of emerging interest to know if a cellular user such as e.g. a UE, in fact is located indoors or outdoors. A network may try to find out if the UE is located indoors is by using positioning services, and more specifically in context of emergency matters. In public safety and emergency scenarios, it would be beneficial to gain better knowledge on e.g. in which building and in which floor a specific UE is located, to be able to warn the user of the UE by notification or call if the user is unknowable in danger, or the other way around if the UE is making an emergency call it is important to identify if the UE is inside a building to be able to send help.

Other areas of application may for example be network optimization algorithms and tuning where it is of interest to know if a UE is inside or outside a specific building, so that a base station may consider the indoor/outdoor classification in the radio resource management to improve the user experience of the UE. For example, indoor UEs may be assumed to be subject to specific mobility behavior, or may be requested to start monitoring indoor cells on a dedicated frequency carrier.

Unfortunately, indoor GPS positioning is often very inaccurate or even impossible. Some indoor radio systems with very high density of cells, such as e.g. Radio-Frequency Identification (RFID) which is a wireless use of electromagnetic fields to transfer data or similar, for the purposes of automatically identifying and tracking tags attached to objects, may possibly deduct a more accurate user location, but such systems are still very rare. RFID is a short range radio tags solution.

Other possible solutions are Inertial Navigation Systems (INS), with or without GPS support. An INS is a navigation aid that uses a computer, motion sensors and rotation sensors to continuously calculate e.g. the position of a moving object without the need for external references. However, so far none of these solutions are practically feasible for cellular UEs of today.

Without information or support from external sources of information it is difficult to distinguish between a UE's indoor and outdoor position from a radio perspective.

It may be concluded that a specific UE is connected to a specific cell, or having that cell as the serving and/or strongest cell within active and monitored set for long enough time, but given cell overlaps in that indoor cells leak to outdoor areas, and the other way around with outdoor cells providing coverage inside buildings, there is not often a clear correspondence between cell-location-belonging and the physical location of a specific UE.

With a solution using for example GPS information, a UE having the GPS active and that the positioning application detects no GPS coverage, the probability of correctly determining the UE position as indoors may improve. Apart from faulty out-of-GPS-coverage location lookups due to the UE being in-pocket of the user or located on a bus, or similar, GPS-assisted solutions require that information about no GPS coverage is signaled from UE to network.

Short range radio tags solutions such as RFID may possibly provide improved indoor positioning, but such systems are currently rare, and corresponding positioning not easily incorporated in today's signalling between a UE and a base station.

SUMMARY

It is therefore an object of embodiments herein to improve the possibilities to establish if a user equipment is indoors or outdoors.

According to a first aspect of embodiments herein, the object is achieved by a method performed by a network node for deciding a probability that a first User Equipment, UE, is located in a building. The network node, the first UE and one or more second UEs operate in a wireless communications network.

The network node learns that one or more second UEs are associated to a respective subscription comprised in a group of subscriptions related to the building. The one or more second UEs are decided to be located in said building.

The network node identifies cell relation metrics for the one or more second UEs associated to the group of subscriptions. The cell relation metrics relate to the building.

The network node then decides the probability that the first UE is located in the building, based on to what extent a cell relation metric of the first UE matches the identified cell relation metrics for the one or more second UEs.

According to a second aspect of embodiments herein, the object is achieved by a network node for deciding a probability that a first User Equipment, UE, is located in a building. The network node, the first UE and one or more second UEs are configured to be operable in a wireless communications network. The network node is configured to:

learn that one or more second UEs are associated to a respective subscription comprised in a group of subscriptions related to the building, which one or more second UEs are decided to be located in said building, identify cell relation metrics for the one or more second UEs associated to the group of subscriptions, which cell relation metrics relate to the building, decide the probability that the first UE is located in the building, based on to what extent a cell relation metric of the first UE matches the identified cell relation metrics for the one or more second UEs.

Since the network node identifies cell relation metrics related to the building for the one or more second UEs associated to the group of subscriptions, the network node can decide the probability that the first UE is located in the building, based on to what extent the cell relation metric of the first UE matches the identified cell relation metrics for the one or more second UEs.

An advantage with embodiments herein is that they are able to more accurately decide UEs as physically indoors or outdoors. This will e.g. improve localization of emergency calls; e.g. which floor in a tall building a UE is positioned, in which specific building the UE probably is located.

Embodiments herein may also be an enabler for other radio network features. Indoor/outdoor classification may be used in the radio resource management to improve the user experience. For example, indoor users may be assumed to be subject to specific mobility behavior, or may be requested to start monitoring indoor cells on a dedicated frequency carrier. Knowing if q UE is in fact indoors or outdoors can help to tune the network so that the UE is connected to the best serving network node. For some outdoor UEs it may be disadvantageous to be served by an indoor node despite that some Key Performance Indicators (KPIs) indicate otherwise for example.

BRIEF DESCRIPTION OF THE DRAWINGS

Examples of embodiments herein are described in more detail with reference to attached drawings in which.

DETAILED DESCRIPTION

Figure 1:
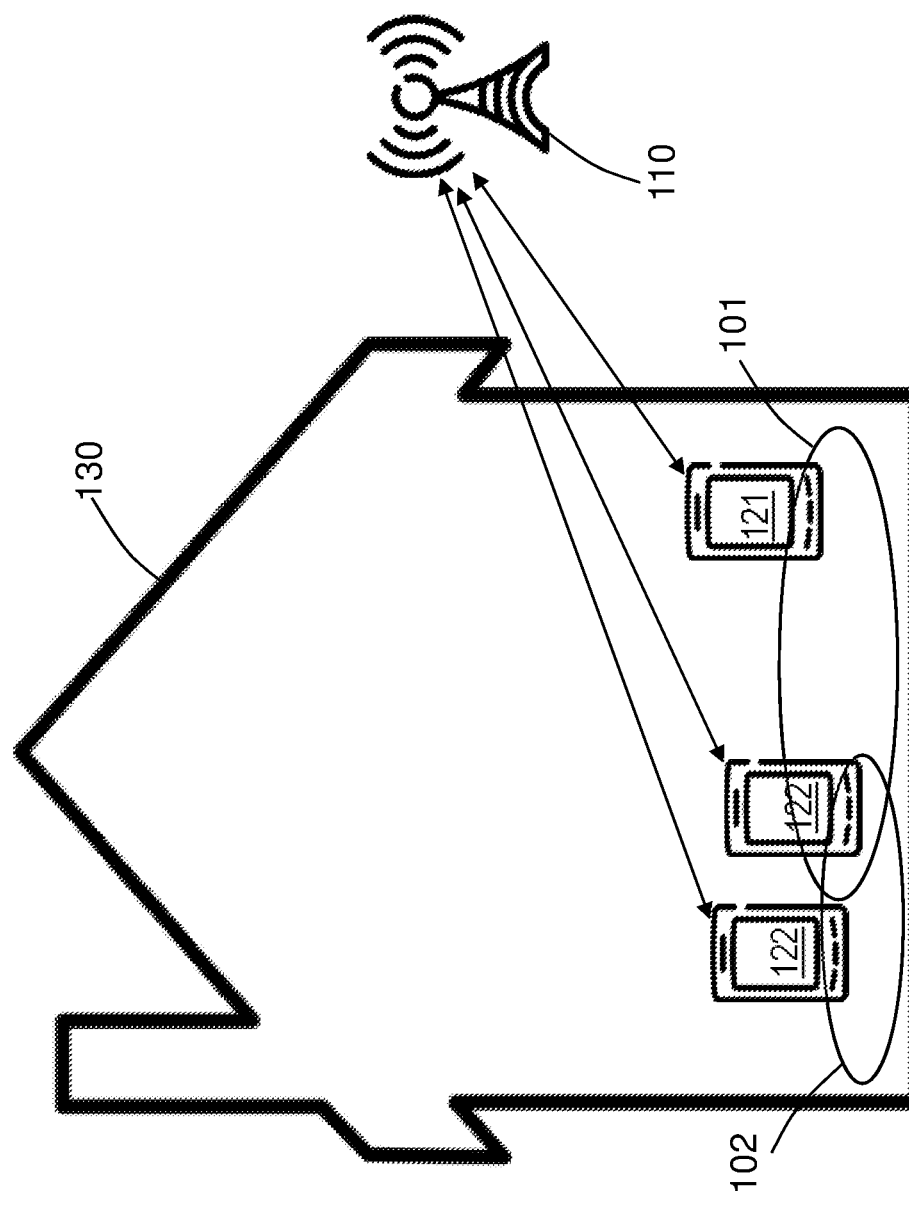
FIG. 1 is a schematic block diagram illustrating embodiments of a communications system.

FIG. 1 depicts an example of a wireless communications network 100 in which embodiments herein may be implemented. The wireless communications network 100 may be a wireless communication network such as an LTE, WCDMA, GSM network, any 3GPP cellular network, Wimax, or any cellular network or system.

The wireless communications network 100 comprises a first cell 101 and one or more second cells 102.

A plurality of network nodes operates in the wireless communications network 100 whereof one, a network node 110 is depicted in FIG. 1. The network node 110 may for example be an eNodeB, a NodeB, a Home Node B, a Home eNode B, a WiFi Access Point (AP) or any other network node capable to serve a UE in a wireless communications network. The network node 110 may in some embodiments be a Radio Network Controller (RNC)

A first UE 121 operates in the wireless communications network 100. The first UE 121 may be served by the network node 110.

The first UE 121 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term UE used in this document also covers other wireless devices such as Machine to Machine (M2M) devices.

Further, one or more second UEs 122 operate in the wireless communications network 100. The one or more second UEs 122 may be served by the network node 110.

Each of the one or more second UEs 122 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term UE used in this document also covers other wireless devices such as M2M devices.

The one or more second UEs 122 are associated to a respective subscription comprised in a group of subscriptions related to a building 130. The one or more second UEs 122 may be located in said building 130. The building 130 may e.g. be a mall a galleria, an arcade a hospital, an airport, office building of varying sizes and forms, science parks, university campus, train stations, sporting venue, arenas, construction site, mining facility, street market, etc. The building 130 may e.g. comprise one or more companies, stores, etc.

The first cell 101 and the one or more second cells 102 may be located in the building 130.

According to some embodiments herein, the network node 110 learns that a specific group of users e.g. comprising the one or more second UEs 122 has a certain relation to a building. This may e.g. be to the building 130, to part of the building 130, to a floor in the building 130, or a corporate location in the building 130. The relation is in the sense that the cellular phone subscriptions of the one or more second UEs 122 are within a specific group, i.e. a group of subscriptions. With this learned knowledge, the network node 110 identifies cell relation metrics for the known group of subscriptions. Based on the identified cell relation metrics, the network node 110 decides whether or not the one or more second UEs 122 are located in the building 130. The network node 110 then applies derived classification metric for unknown users in terms that the geographical belonging of their cellular subscriptions are unknown such as the first UE 121, to increase the probability for unknown users location to be correctly classified and/or decided.

Figure 2:
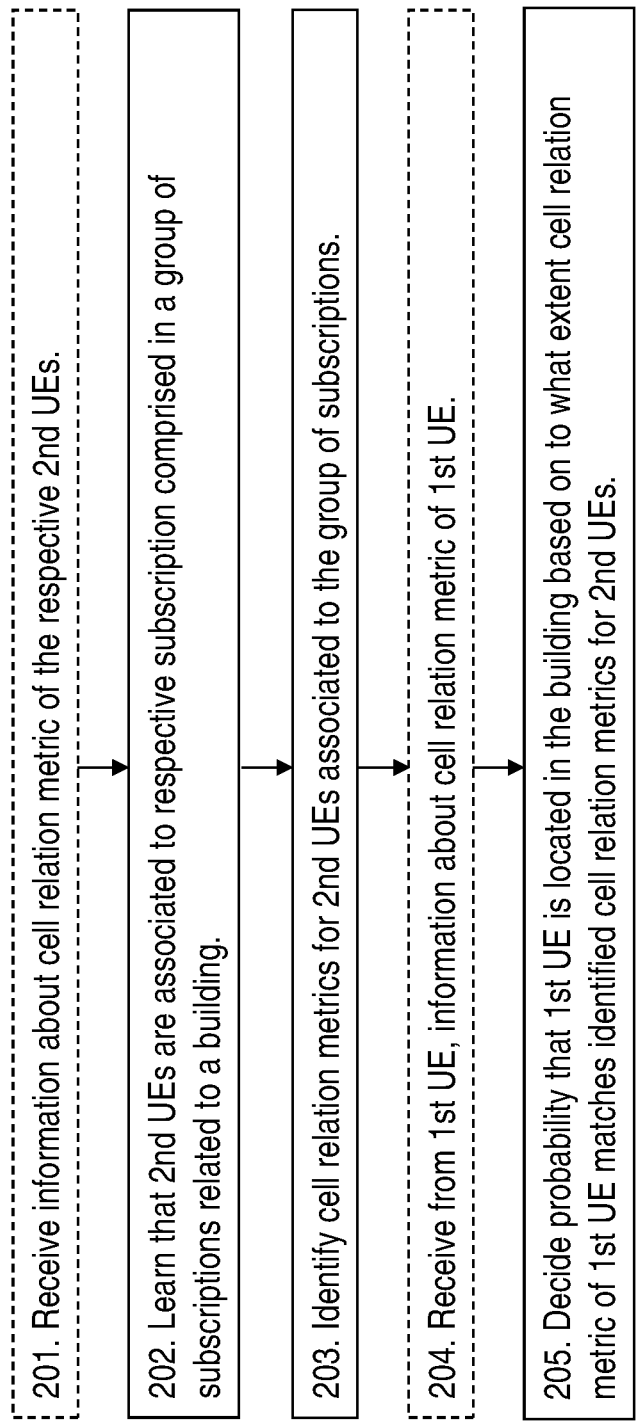
FIG. 2 is a flowchart depicting embodiments of a method in a network node.

Example embodiments of a method performed by a network node 110 for deciding a probability that the first UE 121 is located in the building 130, will be described with reference to a flowchart depicted in FIG. 2. The method will be described in a more general way first, and will be explained and exemplified more in detail later on. As mentioned above, the network node 110, the first UE 121 and one or more second UEs 122 operate in the wireless communications network 100.

In an example scenario, the network node 110 wishes to know whether the first UE of an unknown subscription is located outdoors or indoors, i.e. outside or inside a building.

The method comprises the following actions, which actions may be taken in any suitable order. Actions that are optional are presented in dashed boxes in FIG. 2.

Action 201

In order to learn that a specific group of users, e.g. comprising the one or more second UEs 122, has a certain relation to a building the network node 110 collects related information from connected UEs. Thus the network node 110 may receive a report from the respective one or more second UEs 122, which report comprises information about a cell relation metric of the respective second UE 122. This may be performed by receiving e.g. a measurement report stating signal strength measurements for serving and other detected network nodes.

Action 202

The network node 110 learns that the one or more second UEs 122 are associated to a respective subscription comprised in a group of subscriptions related to the building 130. This may be based on the received reports from the one or more second UEs 122. The one or more second UEs 122 are decided to be located in said building 130.

For example, assume a market place in a city surrounded by some buildings such as the building 130. At the marketplace it may be known that a certain group of subscriptions are associated with Company A, located in a certain building such as the building 130 at a certain floor. If measurements in this building 130 says that the one or more second UEs 122 associated with a subscription comprised in the group is connected to the network node 110 located in the building 130, floor 7, and these second UE:s 122 also hear another network node from a second building pretty strong but still a lot weaker. Furthermore these second UEs 122 also hear a third network node at 20 units of signal strength and vaguely a fourth network node at 1 unit of signal strength.

In Action 203 below, according to this example, this knowledge will be used such as if the network node 110 then receives measurements from another unknown UE, i.e. the first UE 121, that resembles these measurements from the one or more second UEs 122, it can be assumed that to a certain probability this user is also in the building 130, floor 7.

In some embodiments, the network node 110 decides that the one or more second UEs 122 are located in said building 130 based on knowledge of the group of subscriptions. In other words, the network node 110 classifies the one or more second UEs 122 as being indoors or outdoors, of the building 130.

The group of subscriptions relating to the building 130 may comprise: the group of subscriptions belonging to a wireless indoor system located in the building 130 such as e.g. that the group of subscriptions belonging to a specific company.

Action 203

The network node 110 identifies cell relation metrics for the one or more second UEs 122 associated to the group of subscriptions. The cell relation metrics relate to the building 130. Please see example in Action 202.

Action 204

In some embodiments, the network node 110 receives a report from the first UE 121, which report comprises information about the cell relation metric of the first UE 121. The first UE 121 is served by the network node 110. This report may be received in Action 201 above.

Action 205

The network node 110 decides the probability that the first UE 121 is located in the building 130, based on to what extent the cell relation metric of the first UE 121 matches the identified cell relation metrics for the one or more second UEs 122.

The cell relation metrics may comprise the relation of a specific UE 121, 122 to any one or more out of:

The first cell 101, the one or more second cells 102, and the first cell 101 in relation to the one or more second cells 102. The first cell 101 may be a serving cell of the specific UE 121, 122, and the one or more second cells 102 may be neighbouring cells of the specific UE 121, 122. The specific UE 121, 122 may comprise any one or more out of: the first UE 121, and the one or more second UEs 122.

The deciding of the probability that the first UE 121 is located in the building (130), may further is based on how often the first UE 121 changes serving cell from one cell to another cell.

In some embodiments, the cell relation metrics are assigned different values with respect to their respective strength of being a basis for deciding in Action 205, the probability that the first UE 121 is located inside the building 130.

The cell relation metrics may also be referred to as cell relation patterns.

Embodiment's herein will now be further described and explained. The text below is applicable to and may be combined with any suitable embodiment described above.

The network node 110 learns that a specific group of users comprising the one or more second UEs 122 has a certain relation to the building 130. One such example is that their UE subscriptions belong to a specific company. With this learned knowledge it will be more probable that UEs belonging to this group, will report a best cell or a specific subset of cells that e.g. belong to an indoor system of the building 140 or parts thereof, floor, etc.

The respective relation said one or more UEs 122 have with known indoor serving cell such as e.g. the first cell 101, and other detected cells such as e.g. the one or more second cells 102 may be gathered in the network from the one or more UEs 122 by e.g. the network node 110, e.g. via LTE Performance Monitoring Initiated UE Measurements (PMIUM) or WCDMA Geo-localization functionality. The other detected cells such as e.g. the one or more second cells 102 may e.g. be other cells in the same building, other cells not being in the same building, or other outdoor cells, or a combination thereof.

An algorithm e.g. in the network node 110 may learn cell relation metrics such as e.g. serving cell to other cells patterns for the one or more second UEs 122 associated with specific subscriptions, and reapply that learned cell relation metrics on unknown users, e.g. users such as the first UE 121, which origin of subscription is not known.

In some embodiments, typical user-subscription cell relation metrics may be assigned different values with respect to their corresponding strength of classification. In other words, the cell relation metrics may be assigned different values with respect to their respective strength of being a basis for deciding in Action 205, the probability that the first UE 121 is located inside the building 130. Matching known cell relation metrics of the one or more second UEs 122 to measurement data from unknown users such as the first UE 121 may in these embodiments generate a list with order of precedence e.g. sorted by grade of metric matching, i.e. in the end reflecting the probability that a specific user is located indoors or outdoors, such as e.g. the probability that the first UE 121 is located in the building 130.

Decision basis for indoor/outdoor classification such as e.g. for deciding the probability that the first UE 121 is located in the building 130 may be further improved taking UE mobility patterns into consideration. This means that the decision of the probability that the first UE 121 is located in the building 130 in Action 205, further is based on how often the first UE 121 changes serving cell from one cell to another cell. UEs with low mobility from a cell change perspective are plausible to have a corresponding low physical mobility. For example, if a UE report e.g. from the first UE 121 comprises static cell relations and with cell relation metrics sufficiently fulfilled, i.e. typically including known indoor cell, such low-mobility users may be assumed as partly stationary. Such partly stationary user with including known indoor cell such as e.g. an In-Building System (IBS) cell in the building 130, in its metric is likely to be indoors, such as e.g. located in the building 130.

Hence, with fingerprinting and cell relation metrics trained on users such as the one or more second UEs 122 with known subscriptions and known geographical home turf, same cell relation matrices may then be applied on users such as the first UE 121 for which the physical home turf of their subscription is not known, and hence deduct their corresponding plausible location, such as e.g. the probability that the first UE 121 is in the building 130.

Examples of typical metrics according to some cases may be as follows, wherein the unknown user may be the first UE 121, and wherein the known user relates to the one or more second UEs 122:

Case 1. An unknown user reporting a known user subscription associated IBS cell #1 as serving cell with signal strength level above a threshold such as >x dBm and no cells reported as neighbor cells will generate highest probability of being located in the building 130. Wherein the IBS cell #1 may be the first cell 101.

Case 2. An unknown user reporting a known user subscription associated IBS cell #1 as serving cell and a known user subscription associated cell #2 as the only neighbor cell will render higher probability of being located in the building 130. Wherein the IBS cell #1 may be the first cell 101, and wherein the IBS cell #2 may be one of the second cells 102.

Case 3. An unknown user reporting a known user subscription associated IBS cell #1 as serving cell, and as neighbor cells macro cell #1, macro cell #2 and a known user subscription associated IBS cell #2, will typically also be classified as being in the building 130 but with less plausible cell relation metric, i.e. lower probability, than in case 1 and case 2. Wherein the IBS cell #1 may be the first cell 101, and wherein the IBS cell #2 may be one of the second cells 102.

Case 4. An unknown user reporting macro cell #1 as serving cell and as neighbor cells a known user subscription associated IBS cell #1 being on par (in RSRP) macro cell #2, and having a known user subscription associated IBS cell #2 just inside UE measurement range, may be classified as being in an outdoor/indoor transition zone. In other words in a transmission zone between being in the building 130 and being outside the building 130. Wherein the IBS cell #1 may be the first cell 101, and wherein the IBS cell #2 may be one of the second cells 102.

Figure 3:
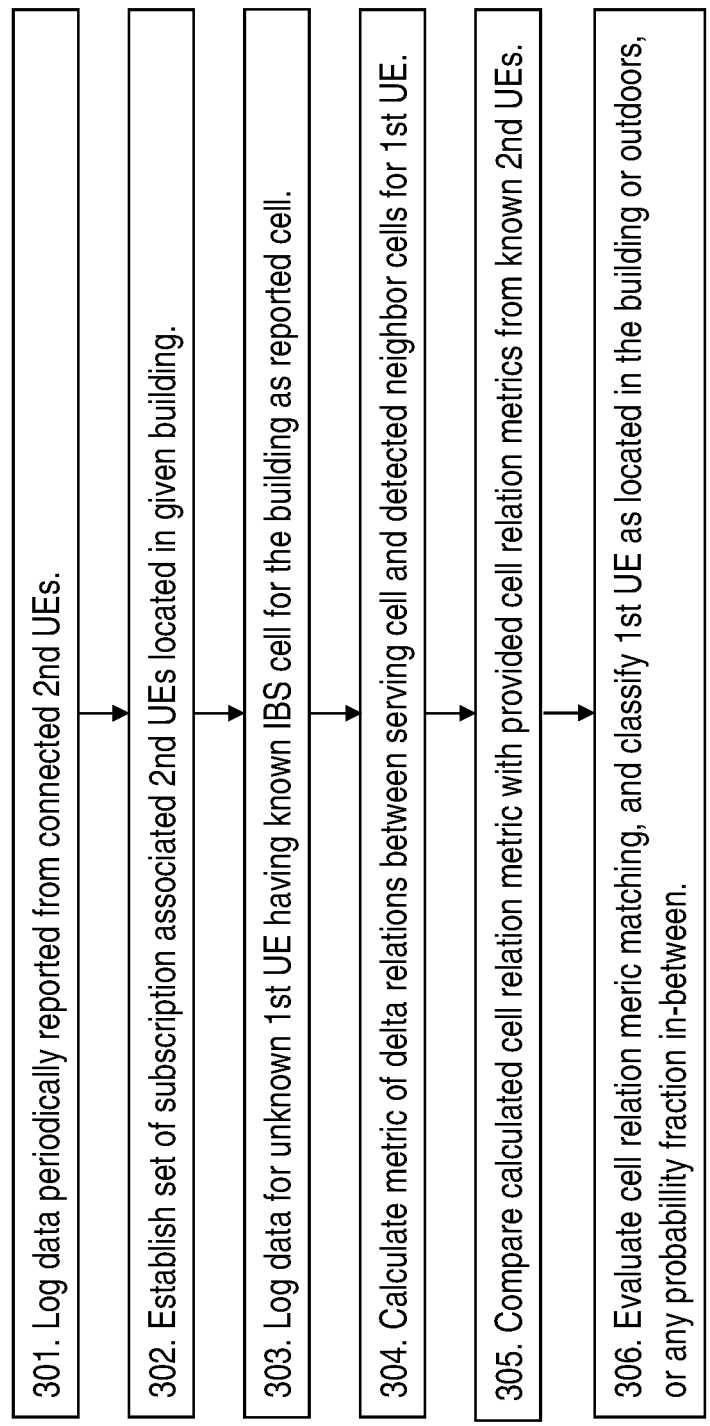
FIG. 3 is a flowchart depicting embodiments of a method in a network node.

An exemplifying flowchart for an indoor classification algorithm, such for deciding the probability that the first UE 121 is in the building 130, is depicted in FIG. 3.

Action 301

This Action relates to Action 201 above. The network node 110 logs data comprising Reference Signal Received Power (RSRP)/Physical Cell Identity (PCI) periodically reported from UEs connected to the network node 110, comprising among them the first UE 121, and one or more second UEs 122. The UEs connected to the network node 110 may be located outside and/or inside the building 130.

Action 302

This Action relates to Action 202 and 203. The network node 110 establishes a set of subscription associated UEs that are located inside the building 130, which comprises the one or more second UEs 122. From the logged data, the network node 110 may create a building 130 to user subscription associated UE list. The list may e.g. comprise any one or more out of: IMSI-to landlord Lookup, an IBS PCI and anatomy of indoor solution, other nearby buildings PCIs, Macro PCIs, GPS coordinates for the building 130. A Landlord here relates to a building owner or manager. The output may e.g. be such as: With probability y % the UEs X2 such as the one of the second UEs 122, are located in building Z3 such as e.g. the building 130, with coordinates latitude X longitude Y.

Action 303

This Action relates to Action 204 above. The network node 110 logs data from an unknown user such as the first UE 121 in the wireless communications network 100 having a known IBS cell for a specific building such as the building 130, as a reported cell.

Action 304

This Action relates to Action 203 above. The network node 110 calculates a cell relation metric such as cell relations or delta relations between serving cells and detected neighbor cells of the first UE 121. This is also performed for the one or more second UEs 122.

Action 305

This Action relates to Action 205 above. The network node 110 compares the calculated relations such as matches the cell relation metrics of the first UE 121 with the cell relation metrics of the one or more second UEs 122.

In some embodiments, the indoor PCI to other cells RSRP metric is calculated. This may be performed by filtering in RSRP domain such as looking at RSRP over a longer time, possibly via a smoothing filter to see how stable/stationary it is, and/or filtering in time domain to benefit from observation that e.g. a known user subscription associated UE has been stable on said PCI relation for e.g. Y1 minutes.

The output of the calculation may be a metric that provides an RSRP metric, also referred to as a an RSRP fingerprint, telling that with known IBS cell as serving cell with a probability z % the first UE 121 may detect cell Q within q dB and cell W within w dB and e.g. another IBS cell E within e dB.

Action 306

This Action relates to Action 205 above. The network node 110 evaluates the compared calculated relations and based on that decides the probability that the first UE 121 is located in the building 130. Such as e.g. basing the decision on to what extent a cell relation metric of the first UE 121 matches the identified cell relation metrics for the one or more second UEs 121

Furthermore, filtering of signal strength and other radio metrics may be applied for example to estimate the mobility of a user such as the first UE 121. For example, if the first UE 121 when it has seemed stationary for a time, has serving to other cells metric matching the area of the subscription associated users such as the one or more second UEs 122, it is more likely to be positioned in the building 130 area where this subscription-associated users generally are located since stationary outdoor users with an indoor-plausible metric are less probable outdoors.

There may for example be cases where a UE in one building is using an opposite building's indoor cell as the serving cell, potentially confusing positioning of this UE. According to embodiments herein, the network node 100 has the additional aid of user-subscription association information such as the cell relation metrics of the second user equipments 122. This user-subscription association information provides an additional input to help in sorting out in which of the two buildings the first UE 121 probably is located, although not providing absolute certainty.

Embodiments herein may not be a one-to-one 100% reliable look-up, but if a general user such as the first UE 121 randomly selected from the network statistics holds same cell-relation metric as a known subscription-associated user such as the one or more second UEs 122, for example having same subscription-associated IBS cell as serving cell and same cell relation metric within some selected delta and given some appropriate filtering applied, it will be likely that the arbitrary selected unknown users has a similar physical location as the prior mentioned known users.

Embodiments herein provides a capability of the network node 110 to use information of cell relations for users with known or more probable indoor location such as the one or more UEs 122 to improve probability of correct indoor/outdoor position classification for unknown users such as the first UE 121.

Such capability may be exploited to improve radio resource management For example tuning the network to have indoor cells pick up indoor traffic. To help identify outdoor areas with poor coverage that should either be covered with an indoor cell or have an additional or retuned outdoor cell.

Further, to improve the user experience by assisting the first UE 121 further in being served by the most appropriate cell. Help in positioning the first UE 121 for emergency or other reasons.

Yet further to improve positioning or emergency callers such as help in deciding if a user of the first UE 121 is indoors or outdoors, or on which floor. If the user e.g. is associated with users having a Company A subscription, and Company A is located on floor 7, there may be an increased probability that the user of the first UE 121 in distress is located on that $7^{th}$ floor.

Figure 4:
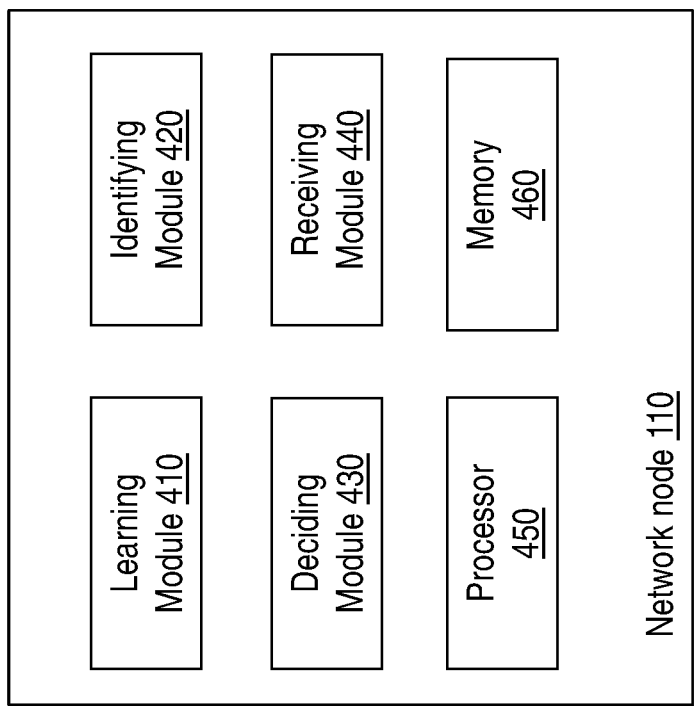
FIG. 4 is a schematic block diagram illustrating embodiments of a network node.

To perform the method actions for deciding a probability that a first UE 121 is located in a building 130 described above in relation to FIGS. 2 and 3, the network node 110 may comprise the following arrangement depicted in FIG. 4. As mentioned above, the network node 110, the first UE 121 and one or more second UEs 122 are configured to be operable in the wireless communications network 100.

The network node 110 is configured to, e.g. by means of a learning module 410 configured to, learn that one or more second UEs 122 are associated to a respective subscription comprised in a group of subscriptions related to the building 130. The one or more second UEs 122 are decided to be located in said building 130.

The network node 110 is further configured to, e.g. by means of an identifying module 420 configured to, identify cell relation metrics for the one or more second UEs 121 associated to the group of subscriptions. The cell relation metrics relate to the building 130.

The group of subscriptions relating to the building 130 may comprise the group of subscriptions belong to a wireless indoor system located in the building 130.

The network node 110 is further configured to, e.g. by means of a deciding module 430 configured to, decide the probability that the first UE 121 is located in the building 130, based on to what extent a cell relation metric of the first UE 121 matches the identified cell relation metrics for the one or more second UEs 122.

The network node 110 may further be configured to, e.g. by means of the deciding module 430 configured to, decide that the one or more second UEs 122 are located in said building 130, based on knowledge of the group of subscriptions.

The network node 110 may further be configured to, e.g. by means of a receiving module 440 configured to, receive a report from the respective one or more second UEs 122, which report comprises information about a cell relation metric of the respective second UE 122.

The network node 110 may further be configured to, e.g. by means of the receiving module 440 configured to, receive a report from the first UE 121, which report comprises information about the cell relation metric of the first UE 121.

In some embodiments, the cell relation metrics comprise the relation of a specific UE 121, 122 to any one or more out of: A first cell 101, one or more second cells 102, and the first cell 101 in relation to the one or more second cell 102. The first cell 101 may be a serving cell of the specific UE 121, 122, and the one or more second cells 102 may be neighbouring cells of the specific UE 121, 122. The specific UE 121, 122 may comprise any one or more out of: the first UE 121, and the one or more second UEs 122.

The cell relation metrics may be assigned different values with respect to their respective strength of being a basis for deciding the probability that the first UE 121 is located inside the building 130.

The network node 110 may further be configured to decide the probability that the first UE 121 is located in the building 130, further based on how often the first UE 121 changes serving cell from one cell to another cell.

The embodiments herein may be implemented through one or more processors, such as a processor 450 in the network node 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 460 comprising one or more memory units. The memory 460 comprises instructions executable by the processor 450.

The memory 460 is arranged to be used to store e.g. information about the cell relation metrics, the cell relation metrics' assigned different values, data, configurations, and applications to perform the methods herein when being executed in the network node 110.

Those skilled in the art will also appreciate that the modules in the network node 110, described above may refer to a combination of analog and digital circuits, and/or one or more processors configured with software and/or firmware, e.g. stored in the memory 460, that when executed by the one or more processors such as the processor 450 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Abbreviations
Abbreviation Explanation
D2D Device to Device
Geo-W WCDMA Geo-localization
GPS Global Positioning System
IBS In-Building System
IMSI International mobile subscriber identity
INS Inertial Navigation Systems
KPI Key Performance Indicator
LTE Long Term Evolution
M2M Machine to Machine
PCI Physical Cell Identity
PMIUM PM-Initiated UE Measurements; Ericsson product
RSRP Reference signal Received Power
UE User Equipment

The invention claimed is:

1. A method performed by a network node for deciding a probability that a first User Equipment, UE, is located in a building, where the network node, the first UE and one or more second UEs operate in a wireless communications network, the method comprising:
determining that the one or more second UEs are associated with a respective subscription comprised in a group of subscriptions related to the building, where the one or more second UEs are located in said building;
identifying cell relation metrics in relation to the building for the one or more second UEs associated with the group of subscriptions; and
deciding the probability that the first UE is located in the building based on a cell relation metric of the first UE in relation to the identified cell relation metrics for the one or more second UEs.

2. The method according to claim 1, wherein the decision that the one or more second UEs are located in said building is based on knowledge of the group of subscriptions.

3. The method according to claim 1, further comprising:
receiving a report from the respective one or more second UEs, which report comprises information about a cell relation metric of the respective second UE, and
receiving a report from the first UE, which report comprises information about the cell relation metric of the first UE.

4. The method according to claim 1, wherein the group of subscriptions relating to the building comprises the group of subscriptions belong to a wireless indoor system located in the building.

5. The method according to claim 1, wherein the cell relation metrics comprise the relation of a specific UE to any one or more out of: a first cell, one or more second cells, and the first cell in relation to the one or more second cell, which first cell is a serving cell of the specific UE, and which one or more second cells are neighboring cells of the specific UE, wherein the specific UE comprises any one or more out of: the first UE, and the one or more second UEs.

6. The method according to claim 1, wherein the cell relation metrics are assigned different values with respect to their respective strength of being a basis for deciding the probability that the first UE is located inside the building.

7. The method according to claim 1, wherein deciding the probability that the first UE is located in the building, further is based on how often the first UE changes serving cell from one cell to another cell.

8. A network node for deciding a probability that a first User Equipment, UE, is located in a building, which network node, the first UE and one or more second UEs are configured to be operable in a wireless communications network, which network node is configured to:
learn that one or more second UEs are associated to a respective subscription comprised in a group of subscriptions related to the building, which one or more second UEs are decided to be located in said building, identify cell relation metrics for the one or more second UEs associated to the group of subscriptions, which cell relation metrics relate to the building, and decide the probability that the first UE is located in the building, based on to what extent a cell relation metric of the first UE matches the identified cell relation metrics for the one or more second UEs.

9. The network node according to claim 8, wherein the decision that the one or more second UEs are located in said building is based on knowledge of the group of subscriptions.

10. The network node according to claim 8, further being configured to:

receive a report from the respective one or more second UEs, which report comprises information about a cell relation metric of the respective second UE, and receive a report from the first UE, which report comprises information about the cell relation metric of the first UE.

11. The network node according to claim 8, wherein the group of subscriptions relating to the building comprises the group of subscriptions belong to a wireless indoor system located in the building.

12. The network node according to claim 8, wherein the cell relation metrics comprise the relation of a specific UE to any one or more out of: a first cell, one or more second cells, and the first cell in relation to the one or more second cell, which first cell is a serving cell of the specific UE, and which one or more second cells are neighboring cells of the specific UE, wherein the specific UE comprises any one or more out of: the first UE, and the one or more second UEs.

13. The network node according to claim 8, wherein the cell relation metrics are assigned different values with respect to their respective strength of being a basis for deciding the probability that the first UE is located inside the building.

14. The network node according to claim 8, wherein the network node is configured to decide the probability that the first UE is located in the building further based on how often the first UE changes serving cell from one cell to another cell.

* * * * *